US008891403B2

(12) United States Patent
Ganapathy et al.

(10) Patent No.: US 8,891,403 B2
(45) Date of Patent: *Nov. 18, 2014

(54) INTER-CLUSTER COMMUNICATIONS TECHNIQUE FOR EVENT AND HEALTH STATUS COMMUNICATIONS

(75) Inventors: Arunachalam Ganapathy, Bangalore (IN); Rajeev Mishra, Bangalore (IN); Lance W. Russell, Austin, TX (US); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 13/452,477

(22) Filed: Apr. 20, 2012

(65) Prior Publication Data

US 2012/0254391 A1 Oct. 4, 2012

Related U.S. Application Data

(63) Continuation of application No. 13/079,182, filed on Apr. 4, 2011, now Pat. No. 8,634,330.

(51) Int. Cl.
*H04L 12/28* (2006.01)
*H04L 29/12* (2006.01)

(52) U.S. Cl.
CPC .......... *H04L 61/103* (2013.01); *H04L 61/6022* (2013.01)
USPC ............................ 370/254; 370/256; 370/408

(58) Field of Classification Search
CPC ..... H04L 45/02; H04L 41/12; H04L 61/6022; H04L 61/103
USPC ........................... 370/252–254, 256, 408, 401
See application file for complete search history.

(56) References Cited

U.S. PATENT DOCUMENTS

| | | | |
|---|---|---|---|
| 6,038,563 A | 3/2000 | Bapat et al. |
| 6,064,656 A | 5/2000 | Angal et al. |
| 6,185,613 B1 | 2/2001 | Lawson et al. |
| 6,411,967 B1 | 6/2002 | Van Renesse |
| 6,591,317 B1 | 7/2003 | Schzukin et al. |
| 6,631,363 B1 | 10/2003 | Brown et al. |
| 6,745,157 B1 | 6/2004 | Weiss et al. |

(Continued)

FOREIGN PATENT DOCUMENTS

WO WO2004031979 A2 4/2004

OTHER PUBLICATIONS

Office Action in U.S. Appl. No. 13/079,182 mailed on Jun. 5, 2013, 17 pages (pp. 1-17 in pdf).

(Continued)

*Primary Examiner* — Chuong T Ho
(74) *Attorney, Agent, or Firm* — Mitch Harris, Atty at Law, LLC; Andrew M. Harris; Matthew W. Baca

(57) ABSTRACT

Communication between clusters of processing nodes is initiated by designating a link layer address and a target node name in a remote cluster. The link layer address is transmitted to the target node via a regular network transmission. The link layer address is stored locally in each cluster and the nodes in each cluster are signaled that a configuration change has been made, so that gateway nodes in the clusters can obtain the link layer address to use for subsequent communications with the other cluster, such as event notifications of node status changes.

13 Claims, 5 Drawing Sheets

(56) References Cited

U.S. PATENT DOCUMENTS

| | | | |
|---|---|---|---|
| 6,778,504 B2 | 8/2004 | Santry et al. | |
| 6,862,619 B1 | 3/2005 | Sugauchi et al. | |
| 6,983,324 B1 | 1/2006 | Block et al. | |
| 7,058,957 B1 | 6/2006 | Nguyen | |
| 7,171,476 B2 | 1/2007 | Maeda et al. | |
| 7,542,437 B1 | 6/2009 | Redi et al. | |
| 7,542,459 B2 | 6/2009 | Conner et al. | |
| 7,571,230 B2 | 8/2009 | Gissel et al. | |
| 7,593,996 B2 | 9/2009 | Gole et al. | |
| 7,650,404 B2 | 1/2010 | Parupudi et al. | |
| 7,664,125 B1 * | 2/2010 | Bauer et al. | 370/408 |
| 7,716,323 B2 | 5/2010 | Gole et al. | |
| 7,856,480 B2 | 12/2010 | Muchow | |
| 7,913,105 B1 | 3/2011 | Ganesh et al. | |
| 8,108,715 B1 * | 1/2012 | Agarwal | 714/10 |
| 8,161,053 B1 | 4/2012 | Khan et al. | |
| 8,384,549 B2 | 2/2013 | Lemmon | |
| 8,433,760 B2 | 4/2013 | Ganapathy et al. | |
| 8,484,472 B2 | 7/2013 | Sherkin et al. | |
| 8,634,330 B2 * | 1/2014 | Ganapathy et al. | 370/254 |
| 2002/0178275 A1 | 11/2002 | Hein et al. | |
| 2003/0061340 A1 | 3/2003 | Sun et al. | |
| 2003/0088831 A1 | 5/2003 | Bauer et al. | |
| 2003/0093516 A1 | 5/2003 | Parsons et al. | |
| 2003/0105801 A1 | 6/2003 | Tse et al. | |
| 2003/0105850 A1 | 6/2003 | Lean et al. | |
| 2003/0225840 A1 | 12/2003 | Glassco et al. | |
| 2003/0233594 A1 | 12/2003 | Earl | |
| 2004/0008727 A1 | 1/2004 | See et al. | |
| 2004/0030775 A1 | 2/2004 | Lauzon et al. | |
| 2004/0064835 A1 | 4/2004 | Bellwood et al. | |
| 2004/0172467 A1 | 9/2004 | Wechter et al. | |
| 2005/0065953 A1 | 3/2005 | Bower et al. | |
| 2005/0076145 A1 * | 4/2005 | Ben-Zvi et al. | 709/245 |
| 2005/0152396 A1 | 7/2005 | Pichna et al. | |
| 2005/0210128 A1 | 9/2005 | Cannon et al. | |
| 2005/0234929 A1 | 10/2005 | Ionescu et al. | |
| 2006/0031282 A1 | 2/2006 | Tuttle et al. | |
| 2006/0050629 A1 | 3/2006 | Saika | |
| 2007/0041328 A1 | 2/2007 | Bell, IV | |
| 2007/0140243 A1 | 6/2007 | Eastham | |
| 2007/0226182 A1 | 9/2007 | Sobotka et al. | |
| 2007/0271276 A1 | 11/2007 | Allen et al. | |
| 2007/0282959 A1 | 12/2007 | Stern | |
| 2008/0008106 A1 | 1/2008 | Boberg et al. | |
| 2008/0077635 A1 | 3/2008 | Sporny et al. | |
| 2008/0097628 A1 | 4/2008 | Weatherhead et al. | |
| 2008/0183857 A1 | 7/2008 | Barfield et al. | |
| 2008/0317050 A1 | 12/2008 | Xiong et al. | |
| 2009/0043887 A1 | 2/2009 | Coekaerts | |
| 2009/0138808 A1 | 5/2009 | Moromisato et al. | |
| 2009/0199051 A1 | 8/2009 | Jann et al. | |
| 2009/0268633 A1 | 10/2009 | Pan et al. | |
| 2010/0077310 A1 | 3/2010 | Karachale et al. | |
| 2010/0094922 A1 | 4/2010 | Sathish | |
| 2010/0099447 A1 | 4/2010 | Boberg et al. | |
| 2010/0113072 A1 | 5/2010 | Gibson et al. | |
| 2010/0115338 A1 | 5/2010 | Rao et al. | |
| 2010/0153528 A1 | 6/2010 | Pearson et al. | |
| 2010/0223492 A1 | 9/2010 | Farrugia et al. | |
| 2010/0274885 A1 | 10/2010 | Yoo et al. | |
| 2010/0281304 A1 | 11/2010 | Moyer et al. | |
| 2010/0290469 A1 | 11/2010 | Assarpour | |
| 2010/0332277 A1 | 12/2010 | Dentzer et al. | |
| 2011/0035462 A1 | 2/2011 | Akella | |
| 2011/0041140 A1 | 2/2011 | Harm et al. | |
| 2011/0093743 A1 | 4/2011 | Arcese et al. | |
| 2011/0145639 A1 | 6/2011 | Farahmand et al. | |
| 2011/0202500 A1 | 8/2011 | Warn et al. | |
| 2011/0274053 A1 | 11/2011 | Baik et al. | |
| 2012/0036250 A1 | 2/2012 | Vaswani et al. | |
| 2012/0047257 A1 | 2/2012 | Hauser | |
| 2012/0144018 A1 | 6/2012 | Fried et al. | |
| 2012/0203897 A1 | 8/2012 | Mishra et al. | |
| 2012/0203899 A1 | 8/2012 | Ganapathy et al. | |
| 2012/0250569 A1 * | 10/2012 | Chanda | 370/252 |
| 2013/0042001 A1 | 2/2013 | Gould et al. | |

OTHER PUBLICATIONS

Notice of Allowance in U.S. Appl. No. 13/079,182 mailed on Sep. 16, 2013, 13 pages (pp. 1-13 in pdf).

* cited by examiner

INTER-CLUSTER COMMUNICATIONS TECHNIQUE FOR EVENT AND HEALTH STATUS COMMUNICATIONS

BACKGROUND

1. Field of the Invention

The present invention is related to communications between nodes in different clusters in large-scale distributed computer systems, and more specifically to a technique for inter-cluster communication that shares a link layer address between clusters.

2. Description of Related Art

In large-scale distributed computer systems, such as those using distributed software models to perform tasks, multiple nodes provide independent execution of sub-tasks. The nodes are typically organized into clusters in order to perform specific tasks and/or as a physical organization of a processing system, for example, clustering by processor affinity. In order to keep such a system operational, and further, to provide indication of events occurring at one node that either require a reaction from another node or indicate to the other node that either an erroneous operating condition has occurred, or that a phase of processing is complete. In particular, event notification and event logging are operations used to indicate system health to system administrators or software applications, including operating systems components.

Health monitoring techniques employed in distributed processing systems perform an important function in that connections to other nodes must be reliable and all of the active nodes that have been assigned tasks need to perform those tasks in order to ensure that the totality of the processing requirements are met, and in a timely fashion. The health of a node-based distributed processing system is typically monitored by: 1) a heartbeat messaging system, which passes messages between the nodes and a central monitoring component; and 2) an event notification system that signals interested nodes when events occur on other nodes. Event notification systems in node-based distributed processing systems typically require an interested application (a consumer) to register to receive event notifications either with a centralized event manager, or with the processes or objects that generate the events (an event producer). However, the event communications and health status monitoring are typically performed only among nodes in a single cluster.

BRIEF SUMMARY

The invention provides for communications between nodes in different clusters using methods that are embodied in computer-performed methods. The methods provide communications between clusters of nodes that may not share the same network by sharing a link layer address among the nodes in a cluster by storing the link layer address in a persistent storage.

The link layer address is specified along with a target node name in a remote cluster, generally by an administrator setting up the cluster configurations. A local node receiving the link layer address stores the link layer address in local storage accessible by the nodes in the local cluster and sends the local nodes a configuration change message so that the local nodes can retrieve the link layer address to use for subsequent communications with nodes in the remote cluster. The target node name is used to communicate the link layer address to the remote cluster. Upon receiving the link layer address, the target node stores the link layer address in a storage accessible by the nodes in the remote cluster and notifies the nodes that the configuration change has taken place, so that a gateway node(s) in the remote cluster can retrieve the link layer address and use the link layer address to communicate with the gateway node(s) in the other cluster.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for communication between nodes in different clusters of nodes within distributed computing systems. In particular, embodiments of the invention provide for communication of node status changes between different clusters that may be in different geographical locations and on different local area networks (LANs), and communication of other inter-node messaging, such as event messages. Gateway node(s) in each cluster communicate status changes such as node down/up events for their cluster to the remote cluster(s), providing a low bandwidth usage status monitoring.

Figure 1:
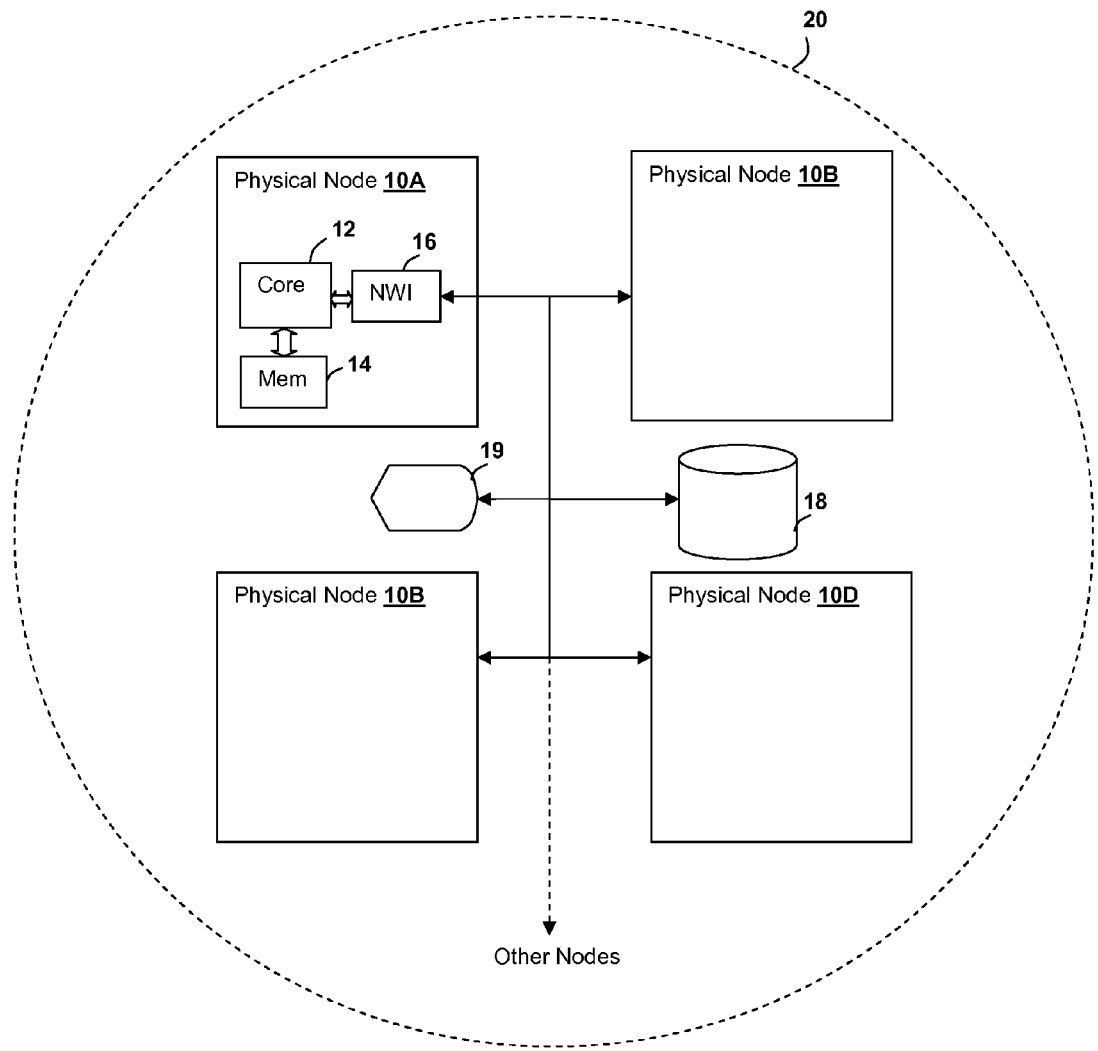
FIG. 1 is a block diagram of a cluster within a distributed computer system in which techniques according to an embodiment of the present invention are practiced.

Referring now to FIG. 1, a cluster 20 within a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide set up of communications and subsequent messaging between either physical processing nodes 10A-10D, or virtual processing nodes partitioned within the depicted computer system as will be described in further detail below, and remote clusters. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-10D are illustrated in cluster 20, a distributed computer system in accordance with an embodiment of the present invention will generally include a large number of compute nodes per cluster and connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
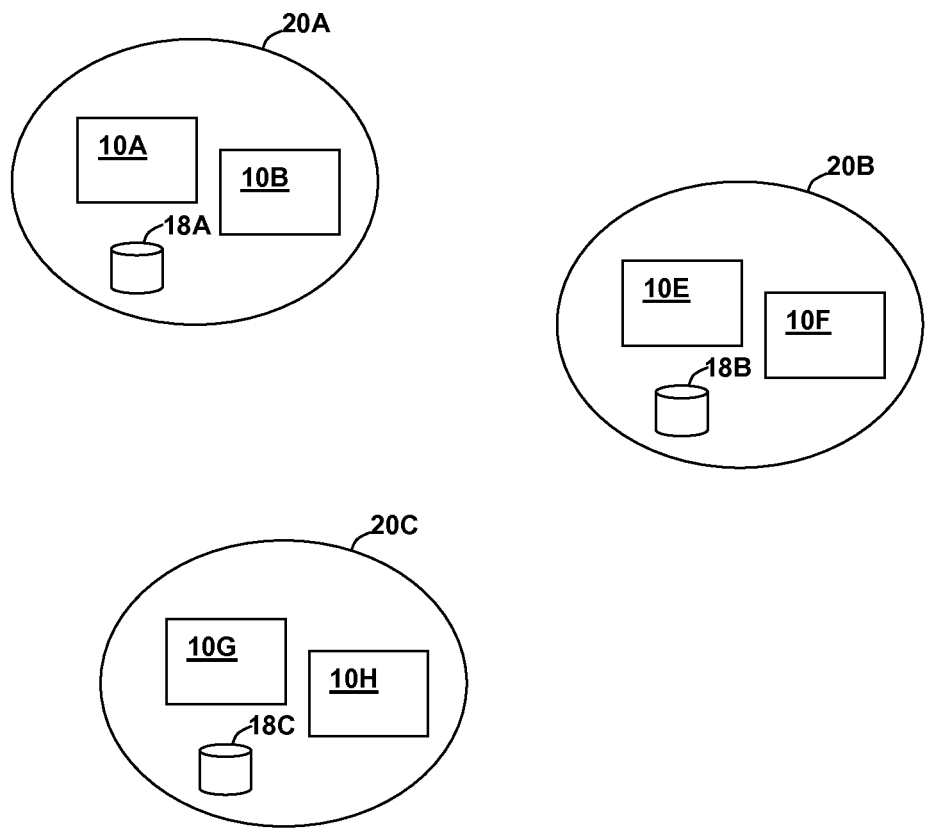
FIG. 2 is a block diagram of a distributed computer system in which techniques according to an embodiment of the present invention are practiced.

Referring now to FIG. 2, a distributed computer system in accordance with an embodiment of the present invention is shown. The depicted computer system includes a plurality of clusters 20A, 20B and 20C, that each include a plurality of processing nodes 10A, 10B in cluster 20A, nodes 10E, 10F in cluster 20B and nodes 10G, 10H in cluster 20C. In general, clusters 20A, 20B and 20C may be geographically distant from each other, which may be the reason for partitioning the particular nodes into the clusters, since communication across the remote interfaces will generally be slower and/or more costly. However, there are other reasons for partitioning systems into clusters, such as for communications traffic management, and the present invention is not limited as to the geographical arrangement of the clusters. Each of clusters 20A, 20B and 20C, has at least one corresponding storage device 18A, 18B and 18C that is readable by all of the nodes in the cluster. In the present invention, the local storage device is used to share configuration between the nodes in a cluster, including the link address that is shared between two or more clusters to enable remote communication between nodes. Clusters 20A, 20B and 20C may not share a top level network such as an Internet Protocol (IP) network, and therefore an address such as an IP address may not uniquely identify a single node or other physical or virtual device. Therefore, as will be explained in further detail below, a node name of a target node is used to identify a remote node to which a link layer address will be passed, so that the node name can be resolved on the local network prior to set up of lower latency communication via the link layer address.

Figure 3:
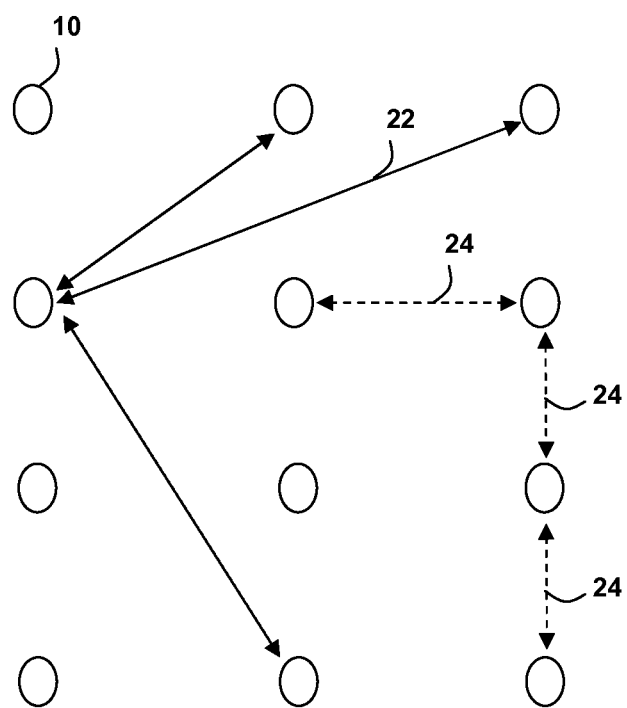
FIG. 3 is a pictorial diagram depicting communication between nodes of a distributed computer system in accordance with an embodiment of the present invention.

Referring now to FIG. 3, communication between multiple nodes 10 of the distributed computer system of FIG. 2 is shown. As mentioned above, nodes 10 may correspond exactly on a one-to-one basis with processing nodes 10A-10H (and other nodes) of FIGS. 1-2, or nodes 10 may be partitioned in a different manner as virtual processing nodes, and nodes 10 can be located in different clusters without requiring communication with a particular interface to a remote cluster. For example, a single node 10 may have exclusive use of multiple processing nodes, e.g. nodes 10A-10B, and result in a system having a greater number of virtual nodes than processing nodes, or alternatively, multiple nodes 10 may be implemented on a single processing node, e.g., node 10A. In the exemplary embodiment, each of nodes 10 represents at least one operating system image and one or more applications executing within the operating system image. In general, the entire system as depicted may execute a single application, but sub-tasks within the application are apportioned to the various nodes 10, which may be identical sub-tasks or different sub-tasks. Messages passed between nodes 10, include events, as well as data and program code transmissions, and messages as needed to support features of embodiments of the present invention, such as gossiping, event messages and other communications that are transmitted to and received from nodes in remote clusters. A separate physical network may be provided for administrative tasks such as event notification and heartbeat messaging, or the same physical networks may be used. The clusters are generally a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 10 pass along messages to other nodes 10. Another alternative is to use a central facility for inter-node communication. However, use of a central facility causes a communications bottleneck, for which reason, among others, passing of a link layer address by which nodes 10 can communicate directly with remote nodes is desirable. By allowing nodes 10 to provide interfaces to other nodes (including remote nodes) directly, communications traffic between nodes can be programmatically independent of what network path the communications will take. (Whether a bottleneck actually exists between two clusters then becomes a question of what node-accessible communications resources are actually present between the clusters to transmit and receive the inter-cluster communications.) In general, the link between clusters could be used for any communication, but in the depicted embodiment, gateway nodes in each cluster generally share only significant events that do not require much bandwidth to communicate, such as node status change events.

Figure 4:
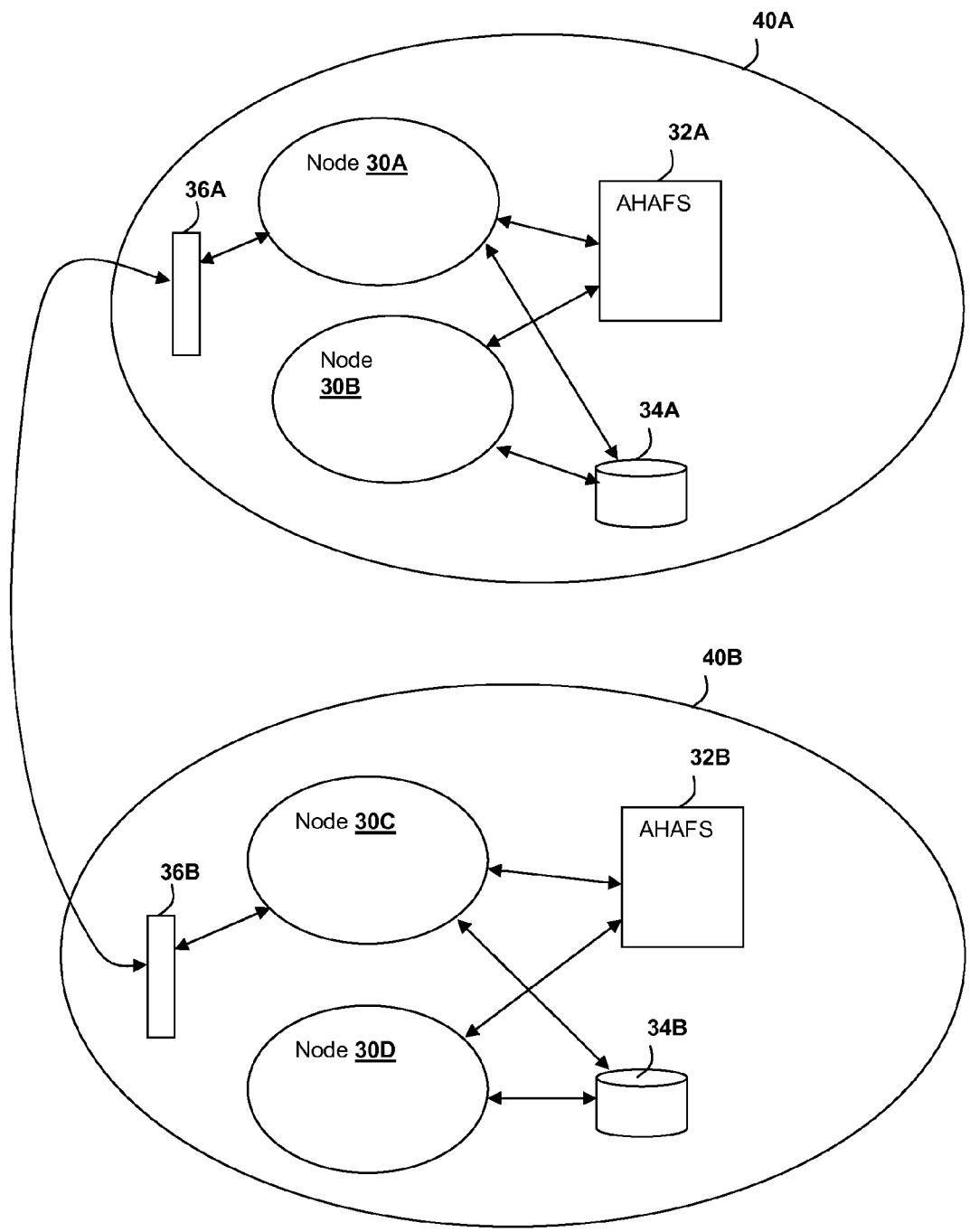
FIG. 4 is a pictorial diagram depicting information flow in a distributed computer system in accordance with an embodiment of the present invention.

Referring now to FIG. 4, information flow in a computer system in accordance with an embodiment of the invention is shown. Two clusters 40A and 40B are shown, each containing corresponding physical or virtual processing nodes 30A-30B and 30C-30D, respectively. Within cluster 40A, nodes 30A-30B communicate with each other directly to exchange gossiping messages, and other information, and communicate with an instance of an Autonomic Health Advisor File System (AHAFS) 32A to transmit and receive event messages. Local persistent storage 34A is provided to store local shared data between nodes in cluster 40A, including the link address and other shared information as described above. Within cluster 40B, nodes 30C-30D, also communicate with each other, with an AHAFS 32B instance and have access to a local persistent storage 34B. Link 36A, 36B represents a communications link through which gateway nodes 30A and 30C may exchange messages such as node status change event messages, via the shared link layer address that corresponds to link 36A, 36B. Link 36A, 36B does not correspond to a physical entity, but rather is used in the diagram to depict a connection that provides for inter-communication between gateway nodes 30A, 30C, which share information received from other components such as AHAFS instances 32A-32B in clusters 40A-40B. Link 36A, 36B exists by observing messages directed at the unique link layer address, e.g., a media access control (MAC) layer address that is specified for communications between gateway nodes 30A and 30C in clusters 40A-40B. One or more unique link layer addresses may be specified for each pair of clusters, and optionally a unique address may be specified for each communication direction of link 36A, 36B. Further, while only one gateway node 30A, 30C is appointed for each cluster 40A, 40B in the depicted embodiment, two gateway nodes may be used for redundancy and the number of nodes that are used as gateway nodes is not a limitation of the present invention.

Figure 5:
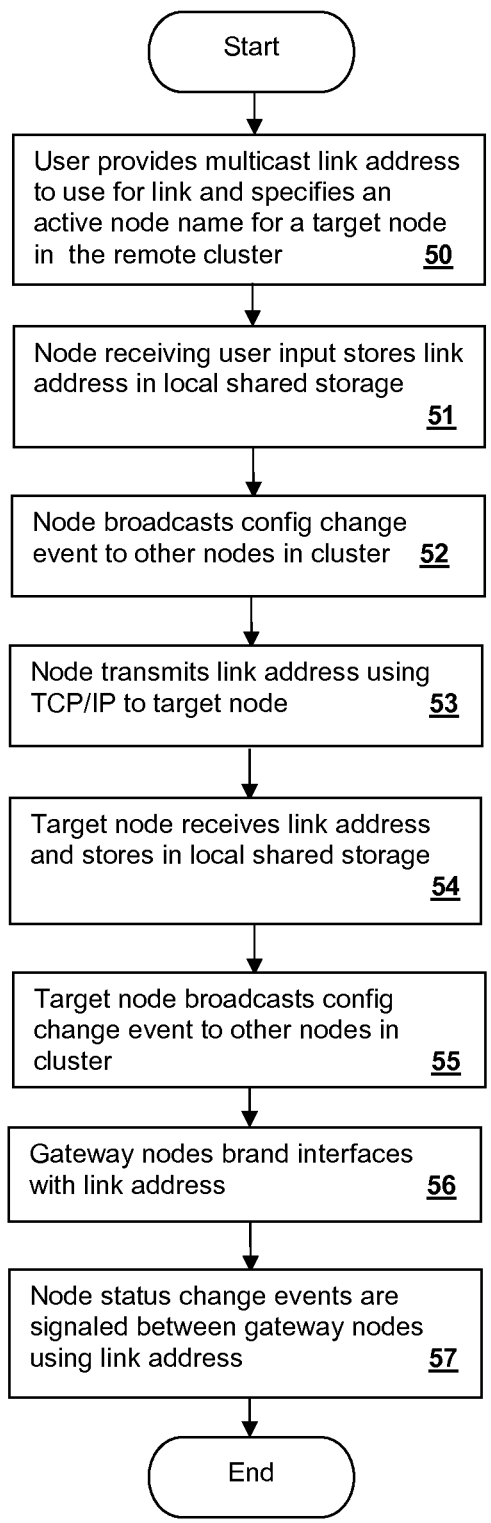
FIG. 5 is a flowchart of a method in accordance with an embodiment of the present invention.

Referring now to FIG. 5, a method in accordance with an embodiment of the present invention is depicted in a flowchart. A user (generally an administrator) accessing a node at a local cluster specifies the link layer address, which in the example is a multicast address, but which could alternatively be a unicast address, and also specifies a target node in the remote cluster (step 50). The node that receives the user input stores the link address in local shared storage (step 51) and broadcasts a configuration change message to other nodes in the local cluster (step 52). The node also transmits the link address to the target node using a network layer communication such as TCP/IP and using the target node name (step 53). The target node receives the link layer address transmission and stores the link layer address in local shared storage (step 54). The target node broadcasts a configuration change message to other nodes in the remote cluster (step 55). In both clusters, once the nodes receive the configuration change message, the gateway nodes brand their interfaces with the link layer address to allow direct communication with the gateway node(s) in the other cluster (step 56). Nodes can then gossip, signal events and perform other communications involving nodes in the other clusters using the link layer address (step 57).

Once the link is established, communications such as node up/down events associated with health status monitoring as disclosed in U.S. patent application "ENDPOINT-TO-ENDPOINT COMMUNICATIONS STATUS MONITORING", Ser. No. 12/959,556, filed on Dec. 3, 2010 and which is incorporated herein by reference, can be extended to track communications between both local and remote nodes to determine node status health. Further, the health of the link between the clusters can be monitored by observing whether the health status of any of the remote nodes is alive, in which case the link is active. If all of the remote nodes are observed as "dead", then the link is dead. Link status is reported by one of the nodes in each cluster via the AHAFS framework as an event (Link UP/Link Down events). Details of the AHAFS framework are disclosed in U.S. Patent Application Publication 200901991051, published on Aug. 6, 2009, and which is incorporated herein by reference.

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Further, while the illustrative embodiment is directed to an AIX (AIX is a trademark of IBM) or other type of UNIX operating system (UNIX is a trademark of The Open Group), in which the event notification is provided by a mountable file system provided as a kernel extension, it is understood that the techniques of the present invention can be applied in event monitoring systems executing under any operating system and can be implemented using proprietary or standardized signaling interfaces as an alternative to the file system interface provided in the depicted embodiments.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for communication within a networked computer system including multiple processing clusters, the clusters comprising a plurality of physical or virtual processing modes, the method comprising:

designating at least one target node in a first one of the processing clusters;

identifying the at least one target node to a given one of the processing nodes in a second one of the processing clusters;

providing a link layer address to use for communication between the first and second processing cluster;

transmitting a message from the given processing node to the target node by identifying the target node using the target node name, wherein the message contains the link layer address;

responsive to the transmitting, receiving the message at the target node;

responsive to the receiving, storing the link layer address in a second shared storage accessible by the processing nodes in the first cluster;

notifying second other ones of the processing nodes in the second cluster of the configuration change, whereby the at least one first gateway node is notified that the link layer address is available to enable communications with the second cluster; and subsequently communicating between at least one first gateway node in the first cluster and at least one second gateway node in the second cluster using the link layer address, whereby the at least one first gateway node and the at least one second gateway node communicate independent of whether the first and second processing clusters are on the same network.

2. The method of claim 1, further comprising:
responsive to the designating and the identifying, storing the link layer address in a first shared storage accessible by the processing nodes in the second cluster; and
notifying first other ones of the processing nodes in the second cluster of a configuration change, whereby the first other nodes are notified that the link layer address is available in the first shared storage, to enable the at least second gateway node to communicate with the first cluster.

3. The method of claim 1, wherein the designating designates at least two target nodes to provide redundant communication of the link address between the first and the second clusters.

4. The method of claim 1, wherein the subsequently communicating comprises transmitting and receiving status change event messages between the first and second clusters.

5. The method of claim 4, wherein the subsequently communicating comprises transmitting and receiving node status change messages between the first and the second clusters.

6. A method for communication within a networked computer system including multiple processing clusters, the clusters comprising a plurality of physical or virtual processing modes, the method comprising:
designating at least one target node in a first one of the processing clusters;
identifying the at least one target node to a given one of the processing nodes in a second one of the processing clusters;
providing a link layer address to use for communication between the first and second processing cluster;
responsive to the designating and the identifying, storing the link layer address in a first shared storage accessible by the processing nodes in the second cluster;
transmitting a message from the given processing node to the target node by identifying the target node using the target node name, wherein the message contains the link layer address;
notifying first other ones of the processing nodes in the second cluster of a configuration change, whereby the first other nodes are notified that the link layer address is available in the first shared storage, to enable the at least second gateway node to communicate with the first cluster; and
subsequently communicating between at least one first gateway node in the first cluster and at least one second gateway node in the second cluster using the link layer address, whereby the at least one first gateway node and the at least one second gateway node communicate independent of whether the first and second processing clusters are on the same network.

7. The method of claim 6, wherein the designating designates at least two target nodes to provide redundant communication of the link address between the first and the second clusters.

8. The method of claim 6, wherein the subsequently communicating comprises transmitting and receiving status change event messages between the first and second clusters.

9. The method of claim 6, wherein the subsequently communicating comprises transmitting and receiving node status change messages between the first and the second clusters.

10. A networked computer system comprising a plurality of processing clusters including a plurality of physical or virtual processing modes, the computer system comprising at least one processor for executing program instructions and at least one memory coupled to the processor for executing the program instructions, wherein the program instructions are program instructions for providing communications between the clusters, the program instructions comprising program instructions for:
receiving user input designating at least one target node in a first one of the processing clusters and a link layer address to use for communication between the first and second processing cluster;
identifying the at least one target node to a given one of the processing nodes in a second one of the processing clusters;
responsive to the designating and the identifying, storing the link layer address in a first shared storage accessible by the processing nodes in the second cluster;
transmitting a message from the given processing node to the target node by identifying the target node using the target node name, wherein the message contains the link layer address;
subsequently communicating between at least one first gateway node in the first cluster and at least one second gateway node in the second cluster using the link layer address, whereby the at least one first gateway node and the at least one second gateway node communicate independent of whether the first and second processing clusters are on the same network; and
notifying first other ones of the processing nodes in the second cluster of a configuration change, whereby the first other nodes are notified that the link layer address is available in the first shared storage, to enable the at least second gateway node to communicate with the first cluster.

11. The computer system of claim 10, wherein the program instructions for receiving user input receive a user input designating at least two target nodes to provide redundant communication of the link address between the first and second processing clusters.

12. The computer system of claim 10, wherein the program instructions for subsequently communicating comprise program instructions for comprises transmitting and receiving status change event messages between the first and second clusters.

13. The computer system of claim 12, wherein the program instructions for subsequently communicating comprise program instructions for transmitting and receiving node status change messages between the first and the second clusters.

* * * * *